UNITED STATES PATENT OFFICE.

ROBERT WIMMER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF REDUCING INDIGO COLORING-MATTERS.

No. 843,566.     Specification of Letters Patent.     Patented Feb. 5, 1907.

Application filed December 1, 1905. Serial No. 289,854.

*To all whom it may concern:*

Be it known that I, ROBERT WIMMER, doctor of philosophy and chemist, a subject of the King of Bavaria, residing at Ludwigshafen-on-the-Rhine, in the Kingdom of Bavaria, German Empire, have invented new and useful Improvements in the Process of Reducing Indigo Coloring-Matters, of which the following is a specification.

In the specification of Letters Patent No. 820,900 is described a process for the reduction of indigo and similar coloring-matters by means of iron in strong caustic-alkali solution.

I have now discovered that indigo and similar coloring-matters (which I will hereinafter refer to as "indigo") can be reduced by means of iron without it being necessary to have present such large quantities of caustic alkali, nor, indeed, any caustic alkali, and that iron in the presence of certain alkali salts has the power of reducing indigo, and that therefore in the process described in the aforesaid specification the caustic alkali can be partly or wholly replaced by such alkali salt. The salts which can be used according to this invention are the alkali salts of indigo-white, the alkali carbonates, the alkali phosphates, and the alkali sulfids. The carbonates, phosphates, and sulfids of the alkalies should be used in concentrated solution. The process can be carried out, for instance, by adding indigo and the corresponding quantity of iron to a solution of the disodium salt of indigo-white, preferably containing at least twenty (20) per cent. of indigo-white. The indigo undergoes reduction and forms the soluble monosodium salt of indigo-white or it separates out in the form of free indigo-white itself, which can by the addition of caustic soda be converted into the soluble sodium salt.

The following examples will serve to further illustrate the nature of my invention and the method of carrying it into practical effect; but my invention is not confined to these examples. The parts are by weight.

Example 1: Stir together, at a temperature of seventy-five (75) degrees centigrade, one hundred (100) parts of a thirty (30) per cent. solution of the disodium salt of indigo-white, twenty (20) parts of indigo, and twenty (20) parts of iron powder. After filtration a solution containing forty (40) per cent. of indigo-white is obtained.

Example 2: Grind well together equal parts of indigo powder, sodium-carbonate crystals, and iron powder. On heating the mixture to a temperature of from ninety (90) to one hundred (100) degrees centigrade reduction to indigo-white takes place. In this example the sodium carbonate can be replaced by three (3) times its weight of sodium phosphate, ($Na_2HPO_4$.)

Example 3: Heat a solution of four hundred (400) parts of crystallized sodium sulfid in two hundred (200) parts of water to a temperature of seventy-five (75) degrees centigrade and add one hundred and fifty (150) parts of iron powder and then gradually two hundred and fifty (250) parts of indigo pure B. A. S. F. A solution of indigo-white is obtained.

Now what I claim is—

1. The process of reducing indigo coloring-matters by heating them with iron powder in a solution of a hereinbefore-mentioned alkali salt.

2. The process of reducing indigo coloring-matters by heating them with iron powder in a solution of an alkali salt of indigo-white.

In testimony whereof I have hereunto set my hand in the presence of two subscribing witnesses.

ROBERT WIMMER.

Witnesses:
J. ALEC. LLOYD,
JOS. H. LEUTE.